Patented Feb. 11, 1941

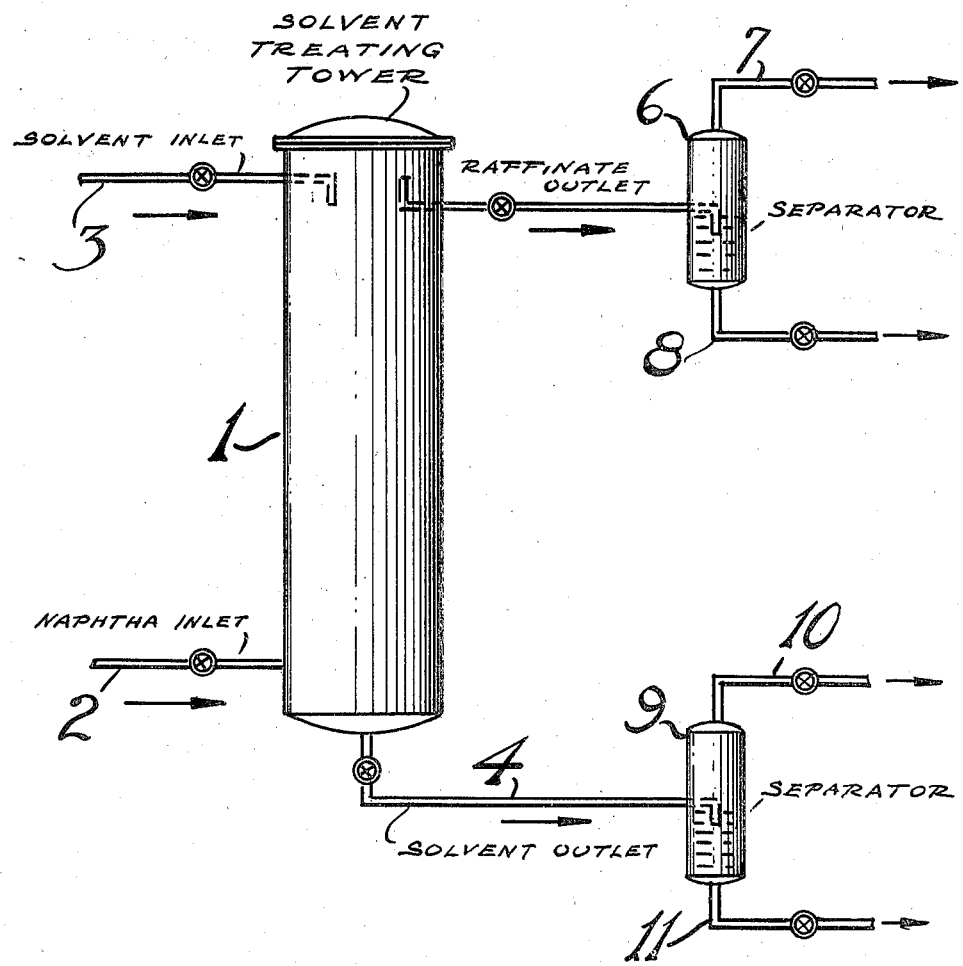

2,231,147

UNITED STATES PATENT OFFICE 2,231,147

SOLVENT TREATING OF MINERAL OILS

Carroll J. Wilson, Hillside, N. J., assignor to Standard Oil Development Company, a corporation of Delaware Application July 30, 1938, Serial No. 222,160

6 Claims. (Cl. 196—13)

The present invention relates to the solvent treatment of mineral oils. It is particularly concerned with the solvent treatment of petroleum oils and especially relates to the solvent treatment of petroleum oils boiling in the gasoline, kerosene and gas oil ranges with a selective solvent selected from the class of alkyl acetoacetates and their derivatives.

It is well known in the art to treat mineral oils, particularly petroleum oils, with selective solvents which have the ability to segregate the relatively more aromatic fractions from the relatively more paraffinic fractions. In processes of this character, the oil and solvent are suitably contacted by various processes, as for example, by a single batch process or by a multi-batch process. The preferred process, however, is the countercurrent tower process in which the lighter phase, usually the oil being treated, is introduced into the bottom of the tower. This oil flows upwardly through the tower intimately contacting downflowing solvent which is introduced into the top of said tower.

The conditions of operation are optimumly adjusted to secure desirable results and depend upon various factors, as for example, the particular solvent or solvent mixture being used, the oil being treated and the quality of products desired. These processes are usually employed in the solvent treatment of petroleum lubricating oils in order to improve their quality. In treating these oils, solvents of the class which have a preferential selectivity for the more aromatic type compounds as compared to the more paraffinic type compounds are employed. Solvents of this class are, for example, phenol, furfural, sulfur dioxide, cresol, nitro benzene, aniline, beta beta dichlor diethyl ether and the like. Mixtures of these solvents are utilized as well as substances of the class of liquefied normally gaseous hydrocarbons. Solvent modifying agents having the ability to modify the selectivity and solvent power of the solvent of the type of water, glycols and alcohols are also employed.

I have now discovered a class of solvents which are desirable for the solvent treatment of mineral oils in order to segregate the relatively more aromatic fractions from the relatively more paraffinic fractions. The solvents of my invention are especially desirable for the treatment of petroleum oils boiling in the naphtha, kerosene, Varsol and gas oil ranges. These solvents are selected from the class of alkyl acetoacetates and their derivatives and are especially adapted for the solvent treatment of petroleum oils boiling in the range from about 100° to 700° F. The preferred solvents are alkyl acetoacetates which contain from 1 to 4 carbon atoms in the alkyl group. An especially desirable solvent is methyl acetoacetate. The halogenated derivatives of these solvents, as for example, mono-chlor ethyl acetoacetate, dichlor methyl acetoacetate and monobrom methyl acetoacetate are also suitable.

The solvents may be contacted with the oil in any suitable manner, as for example, by a single or multi batch process. The preferred process, however, is a countercurrent solvent treating process in which the lighter phase is introduced into the bottom of the tower and the heavier phase is introduced into the top of the tower. The temperature and pressure conditions depend upon the particular solvent or solvent mixture being used, as well as upon the oil being treated and upon the products desired. In general, atmospheric pressure is employed at a temperature below the complete miscibility temperature between the oil and solvent.

One modification of this process may be seen by reference to the attached drawing in which, for the purpose of illustration, it is assumed that a light naphtha boiling in the range from about 100° to 250° F. is being extracted with methyl acetoacetate. Tower 1 represents a countercurrent solvent treating tower containing suitable distributing and contacting means, as for example, distributing plates, pierced plates, overflows and the like. The light naphtha is introduced into tower 1 by means of feed line 2 and flows upwardly through tower 1 intimately contacting downflowing methyl acetoacetate which is introduced into tower 1 by means of feed line 3. The solvent rich phase containing aromatic type materials is removed from tower 1 by means of draw-off line 4 and the raffinate or paraffinic fraction is removed from tower 1 by means of take-off line 5. The raffinate phase is taken to solvent recovery unit 6 and the solvent removed by means of line 7. The solvent free raffinate phase is removed by means of line 8. In a similar manner the extract phase is taken to solvent recovery unit 9 and the solvent removed from the extract by means of line 10. The solvent free extract is removed by means of line 11.

The process of the present invention may vary widely. The volume of solvent used per volume of oil being treated will depend upon the particular solvent being used, as well as upon the feed oil being solvent treated and also upon the quality of products desired. In general, it is preferred to use from one-half to four volumes of solvent per volume of oil being treated. The temperature and pressure conditions are likewise adjusted to secure optimum results and depend upon the solvent being used and also upon the feed oil being treated. In general, it is preferred to use atmospheric pressure or a pressure sufficient to prevent undue vaporization of the feed oil being treated and to employ a temperature somewhat below the complete miscibility temperature of the oil and solvent. For example, when using methyl acetoacetate, the temperature should be in the range from about −20° to 80° F., although lower temperatures may be employed.

The solvent may be removed from the respective phases by any suitable means, as for example, by distillation or washing. The method of separating the solvent from the respective phases will, of course, depend upon the particular solvent being used, as well as upon the oil being extracted and also upon the particular product secured. If there is sufficient difference in the boiling points, the solvent may be removed from the oil by distillation under suitable conditions. If the boiling points are relatively close together or if distillation is undesirable, the solvent may be readily removed from the oil by means of washing, as for example, with water. It has been found that an aqueous alcohol solution is particularly desirable in removing the solvent from the oil. For example, it has been found that methyl acetoacetate is particularly desirable in extracting naphthas boiling in the range from 100° to about 300° to 350° F. These solvents have also been found desirable in extracting Varsols and kerosenes boiling in the range from about 400° to 600° F. When extracting light naphthas of these boiling ranges, the solvent may readily be removed by distillation, although washing may also be employed.

In order to further illustrate the invention, the following example is given and should not be construed as limiting the invention in any manner whatsoever.

EXAMPLE

A blend consisting of 50% aromatic material and 50% paraffin material was solvent extracted with an equal volume of methyl acetoacetate at 48° F. This temperature was approximately 20° below the complete miscibility temperature of the solvent and the oil. The raffinate phase was separated from the solvent extract phase and the solvent removed from the respective phases. The results of this operation were as follows:

Table

|  | Percent of aromatic and paraffinic constituents present | | |
|---|---|---|---|
|  | Feed | Solvent free extract | Solvent free raffinate |
| Aromatic oil constituents | 50 | 58 | 24 |
| Paraffinic oil constituents | 50 | 42 | 76 |
| Total | 100 | 100 | 100 |

The above invention is not to be limited by any theory or mode of operation, but only by the following claims in which it is intended to claim all novelty insofar as the prior art permits.

I claim:

1. Improved process of separating a mineral oil boiling in the range from about 100° to 700° F. into relatively more paraffinic fractions and into relatively more aromatic fractions comprising contacting said oil with a solvent selected from the class consisting of methyl acetoacetate and its halogen substitution products under conditions to form a solvent extract phase and a paraffinic phase, separating the respective phases and removing the solvent therefrom.

2. Process in accordance with claim 1 in which said solvent is a halogenated methyl acetoacetate.

3. Process of separating a petroleum oil boiling in the range from about 100° to 300° F. into relatively more aromatic and into relatively more paraffinic fractions comprising contacting said oil with a solvent selected from the class consisting of methyl acetoacetate and its halogen substitution products at a temperature below the complete miscibility temperature of the oil and solvent, separating the solvent extract and raffinate phases and removing the solvent therefrom.

4. Process in accordance with claim 3 in which said solvent is methyl acetoacetate.

5. Process in accordance with claim 3 in which said solvent is a halogenated methyl acetoacetate.

6. Process of separating a petroleum oil boiling in the naphtha range into relatively more aromatic and into relatively more paraffinic fractions comprising intimately contacting said oil with a halogenated methyl acetoacetate at a temperature below the complete miscibility temperature of the oil and solvent, separating the respective phases and removing said solvent from the oil by washing with an aqueous alcohol solution.

CARROLL J. WILSON.